March 14, 1944.   A. R. JACKSON   2,344,148
EMERGENCY WHEEL BRAKE
Filed April 11, 1942   2 Sheets-Sheet 1
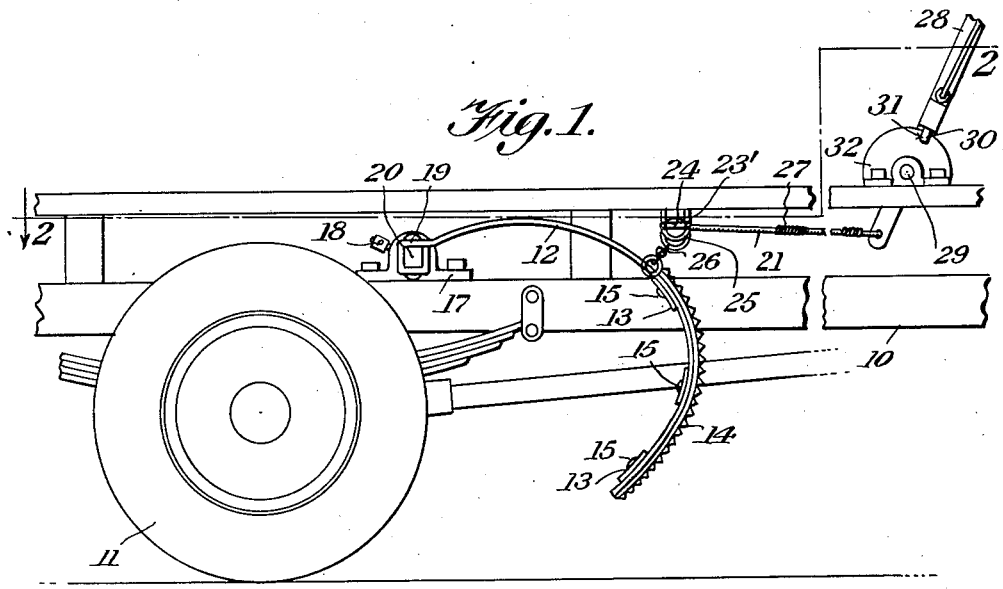
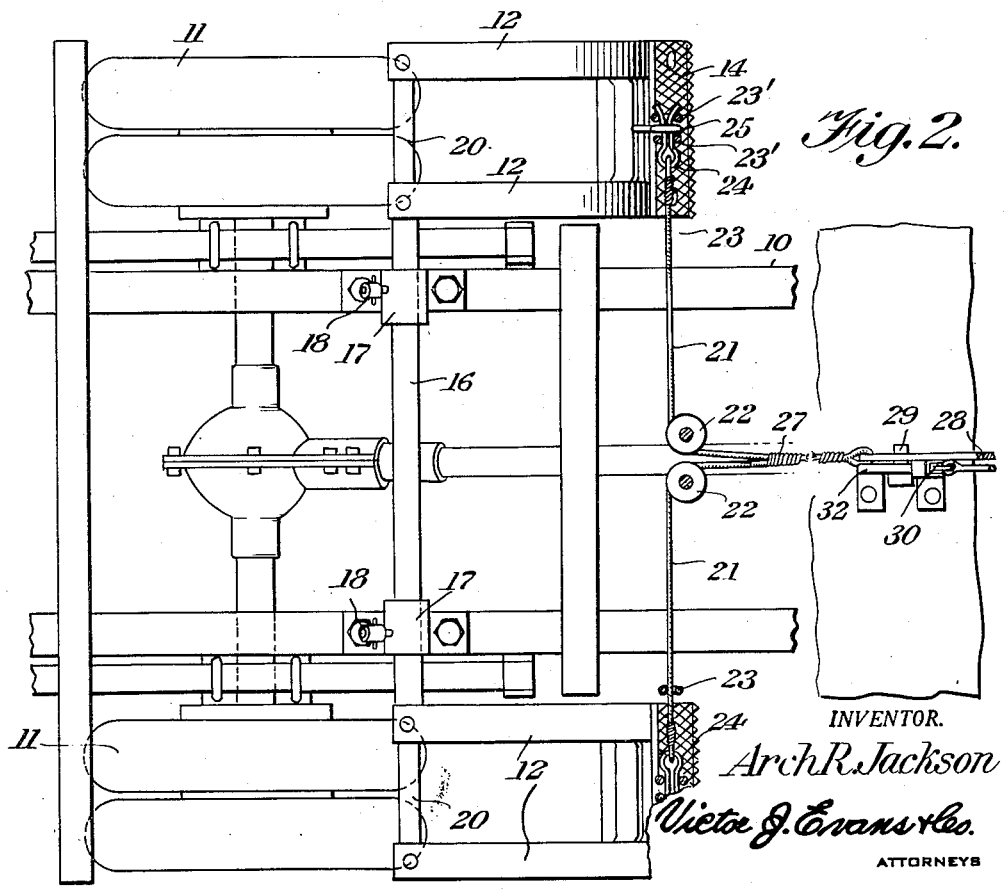
INVENTOR.
Arch R. Jackson
Victor J. Evans & Co.
ATTORNEYS March 14, 1944.  A. R. JACKSON  2,344,148
EMERGENCY WHEEL BRAKE
Filed April 11, 1942  2 Sheets-Sheet 2
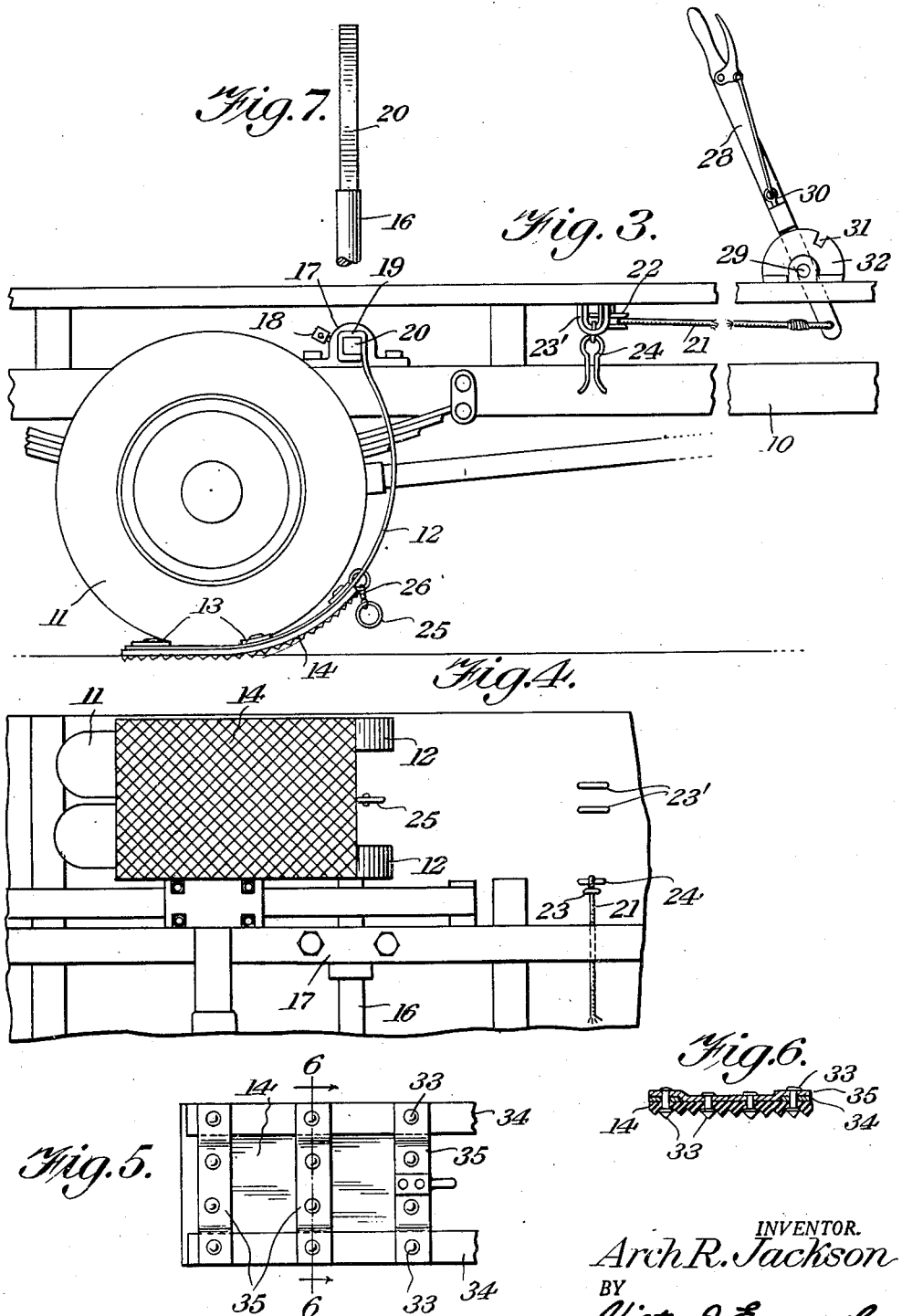
INVENTOR.
Arch R. Jackson
BY
Victor J. Evans & Co.
ATTORNEYS Patented Mar. 14, 1944

2,344,148

UNITED STATES PATENT OFFICE 2,344,148

EMERGENCY WHEEL BRAKE

Arch Robert Jackson, Shavertown, Pa.

Application April 11, 1942, Serial No. 438,631

6 Claims. (Cl. 188—4)

This invention relates to an emergency wheel brake and has for an object to provide a brake carried by the vehicle and adapted to be dropped down so that the vehicle wheel will run upon it as a track and thereby be locked to the vehicle so that the vehicle will be halted in case of getting out of control, brake failure, or other causes.

A further object is to provide apparatus of this character which will be formed of a few strong, simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming a part of this specification:

Figure 1 is a side elevation of an emergency wheel brake constructed in accordance with the invention, in released position.

Figure 2 is a top plan view of the emergency wheel brake of both rear wheels of the vehicle, in released position.

Figure 3 is a side elevation of the emergency wheel brake in operative position for halting the vehicle.

Figure 4 is a bottom plane view of the emergency wheel brake shown in Figure 3.

Figure 5 is a fragmentary top plan view of a modified form of brake, equipped with calks.

Figure 6 is a cross sectional view taken on the line 6—6 of Figure 5.

Figure 7 is a detail top plan view showing the squared end of the supporting shaft of both wheel brakes for the back wheels of a motor vehicle.

Referring now to the drawings in which like characters of reference designate similar parts in the various views, 10 designates a motor vehicle and 11 the dual type rear wheel tires thereof. In carrying out the invention, an emergency brake is associated with each rear wheel and comprises a pair of arcuate leaf springs 12 disposed in spaced relation and connected at spaced intervals by cross bars 13 formed also of leaf springs. A rubber mat 14, formed of the same material as rubber tires, is secured to the leaf springs 12 and cross bars 13 by rivets 15 or other connectors. The bottom surface of the mat is corrugated.

The arcuate leaf springs 12 are of sufficient length to extend from a point underneath the vehicle tires 11 to a transversely disposed shaft 16 which is journaled in bearings 17 disposed on the chassis of the vehicle and provided with lubricating cups 18 so that the shaft will turn freely and not become jammed. The upper ends of the leaf springs 12 are provided with substantially square loops 19 which are engaged around respective end portions 20 of the shaft, these portions being substantially square in cross section, see Figure 7. When in operative position, see Figure 3, the brake members form tracks upon which the rear wheels rest, the tracks forming drags on the roadbed to halt the vehicle in case of emergency.

The emergency wheel brakes are normally held in released position through the medium of a pair of cables 21, see Figure 2, which are trained around respective sheaves 22 disposed on the chassis of the vehicle and trained through U-shaped guides 23 also disposed on the chassis. The outer ends of the cables are equipped with U-shaped coupling pins 24 the legs of which are flared outwardly and are engaged in respective rings 25, see Figure 3, which are suspended by chains 26 from the respective emergency wheel brakes. The inner ends of the cables are connected together by a wrapping 27 of wire or other material to form a unitary strand which is connected to the lower end of an operating lever 28.

The operating lever 28 is pivotally mounted on a shaft 29 which is secured to the chassis in any preferred manner, and is equipped with a latch 30 which is engaged in a notch 31 in a keeper 32 to hold the lever in position to hold the emergency wheel brakes raised, see Figure 1.

To operate the device in an emergency, the latch 30 is released and then the lever is pulled rearwardly, see Figure 3, to disconnect the U-shaped coupling pins 24 from the rings 25 by the forward pull on the cables 21. The emergency wheel brakes immediately gravitate and momentary forward advance of the vehicle causes the rear wheels to ride up on the brakes whereby the rear wheels are locked stationary to the vehicle and the brakes form drag tracks on the road surface to halt the vehicle.

While a rubber pad suitable for use in summer, penetrating means must be used on icy road surfaces in winter and for this purpose calks 33, see Figures 5 and 6, are engaged through the leaf springs 34 and cross bars 35, projecting below the corrugated bottom surface of the rubber mat to penetrate the roadbed.

From the above description it is thought that the construction and operation of the invention will be fully understood without further explanation.

What is claimed is:

1. The combination with a motor vehicle, of releasable track members carried by the vehicle for engagement underneath the rear wheels to halt the vehicle comprising, a pair of spaced arcuate leaf springs, cross bars connecting the springs, a rubber mat on the cross bars and springs, means pivotally connecting the upper ends of the springs to the vehicle, interengaging means for holding the track members in raised position relatively to the wheels, and a lever connected to the interengaging means for disengaging the means to permit the track members to gravitate to operative position underneath the vehicle wheels.

2. The structure as of claim 1 and in which the means for pivoting the members to the vehicle comprises, a shaft disposed transversely on the vehicle, bearings on the vehicle rotatably mounting the shaft, said shaft having angular ends, and angular loops formed on the upper ends of the leaf springs nonrotatably engaging the angular ends of the shaft.

3. The structure as of claim 1 and in which said interengaging means comprises rings carried by the track members, cables trained along the bottom of the vehicle, U-shaped coupling pins having diverging legs adapted to be engaged through said rings, said cables being connected to said lever, the arrangement being such that when the lever is rocked the cables are pulled to withdraw the coupling pins from the rings and permit the track members to gravitate to operative position.

4. The structure as of claim 1 and in which there is added thereto, calks engaged through the leaf springs through the mat and through the cross bars adapted to penetrate the roadbed.

5. In a brake of the type wherein a vehicle carried brake member is mounted to gravitate for engagement underneath a wheel of the vehicle when released, a pair of spaced guide elements carried by the vehicle, a split member extending through and yieldingly held in the said guide elements, a support element carried by the brake member and engaging the split member for holding the brake in elevated inoperative position, and mechanism operative to selectively actuate the split member for releasing the support element and applying the brake.

6. In a brake of the type wherein a vehicle carried brake member is supported in position to gravitate for engagement underneath a wheel of the vehicle upon release, a pair of aligned guide elements adapted for connection with a vehicle in spaced relation, an approximately U-shaped split member extending through and resiliently held in said guide elements, a support element adapted for connection with the brake member normally hooked over the split member between the guide elements for holding the brake in elevated inoperative position, and manually operated mechanism connected with the split member and operable to withdraw the latter with reference to the guide elements whereby to release the support element and effect application of the brake.

ARCH ROBERT JACKSON.